(12) United States Patent
Eggert et al.

(10) Patent No.: US 6,227,320 B1
(45) Date of Patent: May 8, 2001

(54) FOLLOWER INDUSTRIAL TRUCK WITH HANDLE LEVER

(75) Inventors: Nikolaus Eggert, Hamburg; Matthias Kube, Herborn-Schönbach; Ralf Baginski, Neetze; Nis-Georg Nissen, Henstedt-Ulzburg; Frank Mänken, Norderstedt, all of (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 09/138,184

(22) Filed: Aug. 21, 1998

(30) Foreign Application Priority Data

Sep. 3, 1997 (DE) .............................. 197 38 586

(51) Int. Cl.$^7$ .................................................. B62D 51/04
(52) U.S. Cl. ...................... 180/19.2; 180/19.3; 180/65.5; 180/332
(58) Field of Search ................................. 180/12, 13, 15, 180/16, 19.2, 19.3, 252, 253, 65.1, 65.5, 332, 333

(56) References Cited

U.S. PATENT DOCUMENTS

| | | | |
|---|---|---|---|
| 3,364,417 | * | 1/1968 | Norton et al. ...................... 180/19.3 |
| 3,896,892 | * | 7/1975 | Kohls et al. ......................... 180/19.3 |
| 4,942,638 | * | 7/1990 | Helm ................................... 180/19.2 |
| 5,657,828 | | 8/1997 | Nagamachi ......................... 180/19.3 |

FOREIGN PATENT DOCUMENTS

| | | |
|---|---|---|
| 1239573 | 4/1967 | (DE) . |
| 2319618 | 11/1974 | (DE) . |
| 2443375 | 4/1975 | (DE) . |
| 2751333 | 9/1982 | (DE) . |
| 3716375 | 11/1988 | (DE) . |
| 196 14 411 | 10/1996 | (DE) . |

* cited by examiner

*Primary Examiner*—Anne Marie Boehler
(74) *Attorney, Agent, or Firm*—Vidas, Arrett & Steinkraus, P.A.

(57) ABSTRACT

A follower industrial truck including a drive motor, a handle lever having a first end which is linked to a steering shaft of the industrial truck to pivot about a horizontal axis, a handle lever head which is movably mounted with respect to the handle lever in a pull and push manner, a spring arrangement between the handle lever and the head, which biases the head in opposite directions towards a neutral position produces a path signal ($S_{ist}$), the magnitude of the path signal ($S_{ist}$) being approximately proportional to the extent of the deflection, a first controller which produces a first nomimal value ($I_{soll}$) for the current of the drive motor, and a further controller adapted to receive a comparison current value which is achieved by the comparison of the actual current value ($I_{ist}$) of the drive motor and of the first nomimal value ($I_{soll}$) from the first controller in order to produce a setting current value for the drive motor.

11 Claims, 4 Drawing Sheets

FOLLOWER INDUSTRIAL TRUCK WITH HANDLE LEVER

BACKGROUND OF THE INVENTION

The invention relates to a follower industrial truck driven by a motor, with a handle lever.

From DE 12 39 573 there is known a follower industrial truck with a steering handle lever which is linked about a horizontal axis to a steering base which for its part is pivotally mounted about a vertical axis. From DE 27 51 333 there is known a follower industrial truck with which the steering handle lever is mounted to the upper end of a steering shaft which extends vertically downwards through the housing of the drive part. With both industrial trucks on the handle lever head there is provided a driving switch whose operation determines the direction of travel as well as the travel speed.

From DE 37 16 375 a handle lever guided motor-driven industrial truck is known with which the handle lever in the region of the handle, for controlling the drive motor, comprises a switch actuation organ which can be operated at random. For this purpose the handle is displaceably guided, wherein the movement is acquired by a suitable switch which instructs the direction of travel of the vehicle. With this provision it is to be prevented that on picking up the handle lever from the lowered down position or by lowering down from a folded up position the actuating organs for the travel drive are not inadvertently actuated on grasping the handle and the travel drive is switched on.

From DE 24 43 375 there is known an industrial truck with which the upper part of a handle lever is telescopically arranged with respect to the other handle lever part. A spring arrangement is provided so that the upper handle lever part is held in a neutral position. With the adjustment of the upper rod part this also carries out a rotational movement in order to make the adjustment noticeable to the operating person. Switches are provided which are actuated with an adjustment of the upper handle lever part in order to change the drive speed of the industrial truck when the adjustment has reached a predetermined value. The control of the travelling speed via the upper handle lever part on the one hand has a safety aspect. If the upper handle lever part is let go, it automatically goes into the neutral position so that the drive is switched off. With an approach somewhat onto the operating person there is effected an automatic switch-over so that a special approach switch is not required. On the other hand a special travel switch is not required.

BRIEF SUMMARY OF THE INVENTION

It is the object of the invention to provided a follower industrial truck driven by a motor, with a handle lever with which the operator is given a "direct" feeling for the industrial truck without the annoying operation of a travel switch.

The invention takes into account the substantive fact that the rotational path of an otherwise commonly used travel switch changes in dependency on the tilting path of the handle lever. With the operation of the industrial truck the driver must continuously convert the desired power into a rotational movement of the hand. This is particularly disadvantageous in critical travel situations, when the driver attempts to brake the rolling vehicle by "holding steady" or "displacing away" instead of actuating the travel switch and reversing the drive direction.

With the invention the handle lever head or a section connected to the handle of the handle lever head is movable with respect to a section of the handle lever head, which is connected to the handle lever rod, in the pull or push direction of the handle lever. The movability may be provided in a tilting plane or —preferably— linearly in a plane which extends through the axis of the handle lever. The relative movement must by nature be limited. Its extent is acquired by a suitable path sensor. The path sensor may either indirectly or directly measure the covered path. The path may be somewhat measured indirectly in that a spring is impinged and the spring force measured. The force is dependent on the extent of the spring deflection. A direct path measurement may be effected with the help of usual path sensors, for which there are numerous examples.

With the control according to the invention a controller, control or control signal for the drive motor is produced in accordance with a nominal value. According to one formation of the invention a control signal may be formed from the comparison of an actual value and a nominal value. Such a nominal or actual value may e.g. be a current value. With the invention a controller is provided which compares the signal of the path sensor with the nominal value zero and whose control signal forms the nominal value for the motor controlling or control. Thus there is created a control which is designed such that at an ergonomically "comfortable level" a load-dependent, force-dependent and speed-dependent pull and push force control is possible.

The controller with the invention is a so-called position controller which attempts to make the determined deflection zero. Of course however the deflection is not to be zero since otherwise no control signal would be produced for the controller. Therefore the controller comprises a stationary error which has the effect that it is not controlled.

Tremors and unevenness of the ground may, on the vehicle, lead to a relative movement between the handle lever head and the handle lever and thus to an effect on the drive speed. It is therefore useful to provide a damping means between the handle lever and the handle lever head. It may according to a further formation of the invention be made ready by a mechanical friction which must be overcome before a relative movement of the handle lever and head takes place. The path signal dependent on the force on the handle lever head thus describes a hysteresis; all force fluctuations within the hysteresis region do not lead to a change of the control signal.

With one formation of the invention the parts movable relative to one another are also relatively movable transversely to the pull or push plane, and the sensor or a second sensor produces a second signal dependent on the extent of the second relative movement. This signal is given to a steering aid device for producing a steering moment in accordance with the second signal. With follower industrial trucks a steering aid may be of an advantage, in particular with large loads to be transported. An additional steering motor pivots the steering base or the steering shaft in accordance with a control signal which is formed by the first sensor arrangement or a second sensor in dependency on the steering forces produced on the handle lever. It is to be understood that also with the second relative movement pretensioning springs may be provided which according to the exertion of force are deflected to a greater or lesser degree. The deflection of the springs may in turn be directly or indirectly evaluated with the help of suitable sensors, such as force and/or path/angular recorders, e.g. potentiometers, Hall sensors, inductive sensors etc.

The above describe control is load-dependent. It may also be desirable to obtain a load independent control. For this purpose a third controller may be provided which forms a control signal from the comparison of the nominal value from the second controller and of a rotational speed actual value which serves as the nominal value for the first controller.

The handle lever head with the invention may be linearly movably mounted at the upper end of the handle lever rod and be pretensioned in both directions into a neutral position. The pretensioning is effected with the help of springs. If desired the pretensioning in the pull direction may deviate from the push direction. In particular a compensation of the weight of the handle lever head may be carried out. With a more or less upright position of the handle lever the handle lever head produces a force between the movable parts. The pretensioning is selected such that this force does not lead to a deflection and thus does not produce a control signal.

In order to permit a linear movement, according to one formation of the invention a linear bearing may be provided with a sliding piece which is mounted in a sliding guide. The sliding guide may be formed such that it takes up forces in the vertical plane going through the handle lever axis and torsion moments on the handle lever rod, whilst forces occurring transversely to the handle lever axis are taken up by roller bearings which cooperate with linear bearing surfaces of the sliding guide. Roller bearings are preferably provided in the corner regions of a cuboid-shaped sliding piece. The sliding surfaces by nature create a certain friction. This may be used in order to provide a damping effect which counteracts the effects on the handle lever head on account of the unevenness of the ground.

As mentioned the path sensor may be formed from known sensor arrangements. One formation of the invention provides for the path sensor to be formed by a rod magnet which cooperates with a Hall sensor.

A steering aid may also be controlled in that according to the invention a sensor is arranged on the handle lever and determines the forces acting on the handle lever, wherein the steering aid via a control device produces a control signal for a force member in accordance with the measured steering force. Such a force sensor may be formed from strain gauges, piezoelements or likewise. It is to be understood that such a sensoric may be also constructed such that it measures the force component in the pull or push direction as well as transversely thereto in order to produce corresponding signals for the drive motor on the one hand and for the force member for the steering aid on the other hand.

With the formation of the follower industrial truck according to the invention the operator is given a similar feeling as with a fifth-wheel steered vehicle without drive. The measures according to the invention further permit several industrial trucks of the type according to the invention to be coupled to one another for forming a transport chain or a train, wherein the operator "pulls" the forwardmost vehicle and the drive devices of all vehicles are controlled in accordance with the force used. A uniform movement of the coupled vehicle takes place without a jolting of the individual vehicles, which may impede the uniform transport movement. The individual industrial trucks are coupled by a suitable pull means, for example a rod, wherein the pull means engages on the rear side of an industrial truck and connects this with the handle lever or the handle lever head of the subsequent industrial truck.

BRIEF DESCRIPTION OF THE DRAWINGS

Embodiment examples of the invention are subsequently explained in the drawings.

DETAILED DESCRIPTION OF THE INVENTION

Figure 1:
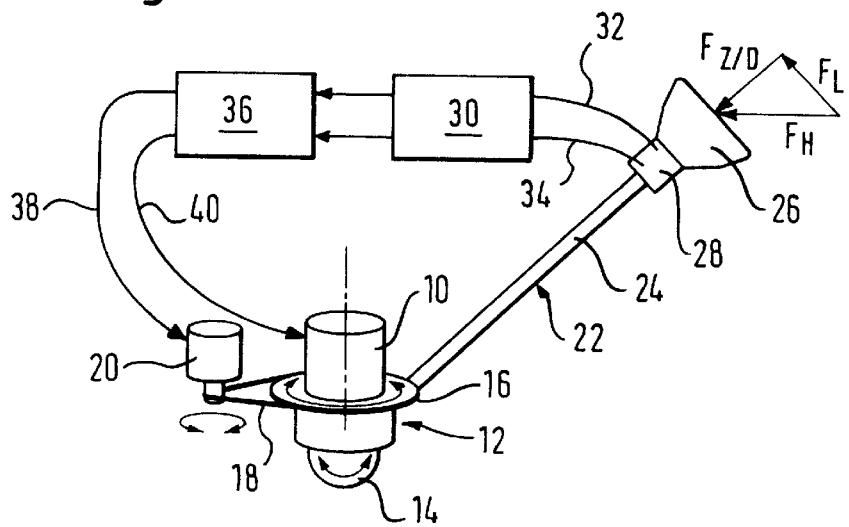
FIG. 1 shows schematically an embodiment example of a follower industrial truck according to the invention.

Of a follower industrial truck in FIG. 1 only the drive and the handle lever are represented. A drive motor 10 is seated on a steering base 12 which is pivotally rotatably mounted about a vertical axis in the framework, not shown, of a drive part of an industrial truck which is also not shown. The base 12 rotatably mounts a drive wheel 14 about a horizontal shaft. The drive wheel 14 can be driven by a motor 10 via a gear which is not shown. The steering base 12 has a cable wheel or chain wheel 16 which cooperates with a steering motor 20 via a cable or chain 18. Alternatively the steering motor 20 and the base 12 may cooperate via a gearwheel step. On the base 12 there engages also a handle lever 22. The handle lever 22 comprises a handle lever rod or handle lever tube 24 as well as a handle lever head 26. The handle lever 22 is pivotally linked on the base 12 about a horizontal axis and may be pivoted between an upright and an approximately horizontal position by the operator.

On the handle lever 22 near to the handle lever head 26 there is mounted a sensor arrangement 28 which is in the position to measure the pulling or pushing which is exerted by the operator onto the handle lever 22 as well as also the transverse component which leads to a pivoting movement of the handle lever 22 or the base 12. The arrow $F_H$ indicates the force of the operator applied to the handle lever head 26, which lies somewhere in space. The force is broken up into a component $F_{Z/D}$ corresponding to the pull or push force which is exerted by the operator onto the handle lever 12. The component $F_L$ running transversely thereto is the steering force on the handle lever 22. According to the measured forces, via leads 32 and 34 signals are given to a control device 30 which converts the signals into corresponding correcting signals for the motor 10 and the steering motor 20 respectively. This is effected via power electronics 36 which via leads 38 and 40 is connected to the steering motor 20 and the drive motor 10 respectively.

The larger the pull or push components (path signal of the path sensor) the larger is the moment of the motor so that the industrial truck may follow the operator or travel ahead of the operator. This applies analogously to the steering motor 20. The higher the steering force on the handle lever 22 the higher is the moment of the motor 20 for supporting the steering movement of the operator.

Figure 2:
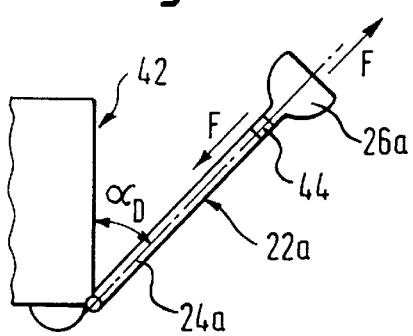
FIG. 2 shows indicated, an industrial truck with a first embodiment form of a handle lever.
Figure 3:
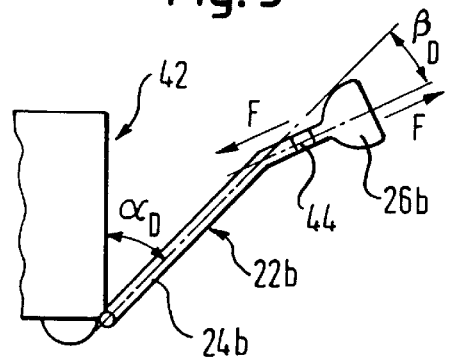
FIG. 3 shows a second embodiment form of a handle lever of an industrial truck.

In the FIGS. 2 and 3 a follower industrial truck 42 is indicated with a handle lever 22a and 22b which comprise a handle lever rod 24a, 24b and a handle lever head 26a, 26b respectively. The handle lever 22a differs from that according to FIG. 3 in that it is straight. The handle lever rod 24b has in contrast near to the handle lever head a bend or a kink. The handle lever heads 26a and 26b are linearly movable with respect to the rod 24a and 24b respectively. This linear movement is acquired with the help of a path sensor 44. If the operator exerts a pull or push force, there is effected a relative displacement between the handle lever head 26a, 26b and the handle lever rod 24a, 24b, which is indicated by the arrow F. The kink of the handle lever 22b with respect to the lower section of the handle lever 22b about the angle $\beta_D$ has the advantage that the weight of the handle lever head 26b hardly has an influence on the relative movement of the mentioned parts, at least in the drawn-in position with the angle $\alpha_D$. One may recognize this well with respect to the representation according to FIG. 2.

Figure 4:
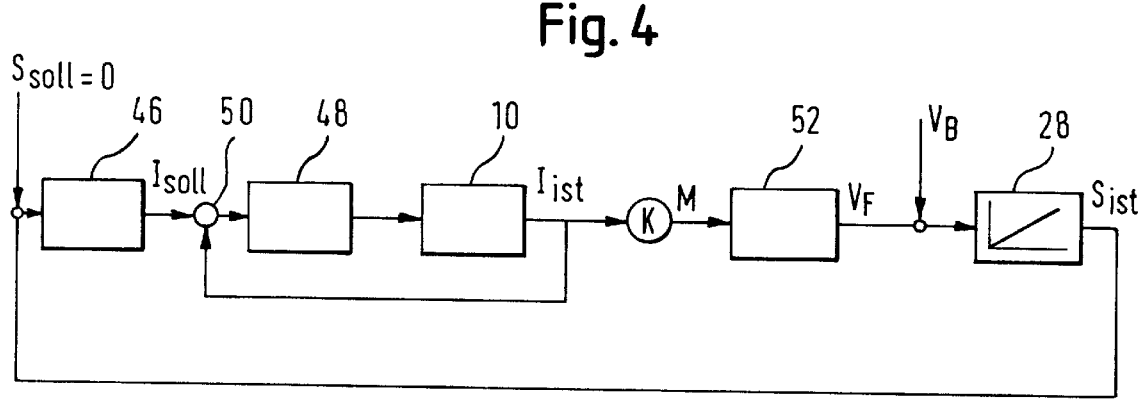
FIG. 4 shows a block diagram of a control for an industrial truck according to FIG. 1.

In FIG. 4 the control diagram for the drive motor 10 is represented. The path sensor 28 (see FIG. 1) measures the deflection of the handle lever head 23 relative to the handle lever rod 24 and produces a corresponding path signal $S_{ist}$ for the bearing controller 46 which produces a current nominal value $I_{soll}$ for a current controller 48 for controlling the torque of the motor 10. The current actual value $I_{ist}$ is lead back to a nominal-actual comparison 50. The current actual value $I_{ist}$ is proportional to the moment taking into account a constant, this moment acting via the drive on the vehicle 52. There results a travel speed $V_F$. This is compared to the speed of the operator $V_B$. The difference leads to a corresponding response of the path sensor 28 in the form of a deflection of the handle lever head 26 relative to the handle lever rod 24.

The shown control attempts to make the deflection of the handle lever head zero again. The nominal value $S_{soll}$ is zero. Naturally this is not desirable since otherwise also the drive moment of the driving motor would be zero. In the controller 46 therefore there is integrated a stationary error which has the effect that the control does not succeed in realizing the zero position for the lever rod head. The controller 46 consequently has a proportional behaviour.

Figure 5:
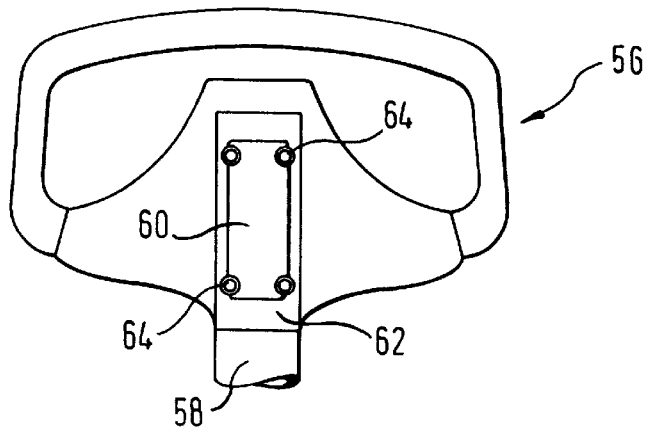
FIG. 5 schematically shows the mounting of the handle lever head.

In FIG. 5 there is represented a handle lever head 56 of a construction known per se. It is connected to a handle lever rod 58 wherein however a linear relative movement is possible. For this purpose the handle lever rod 58 is connected to a sliding piece 60 which is linearly movably guided in a sliding guide 62 of the handle lever head 50, which is not shown in further detail in FIG. 5. For this purpose the sliding piece 60 at the four corner regions comprise roller bearings 64. The mounting indicated in FIG. 5 is shown in more detail in the FIGS. 6 to 8.

Figure 6:
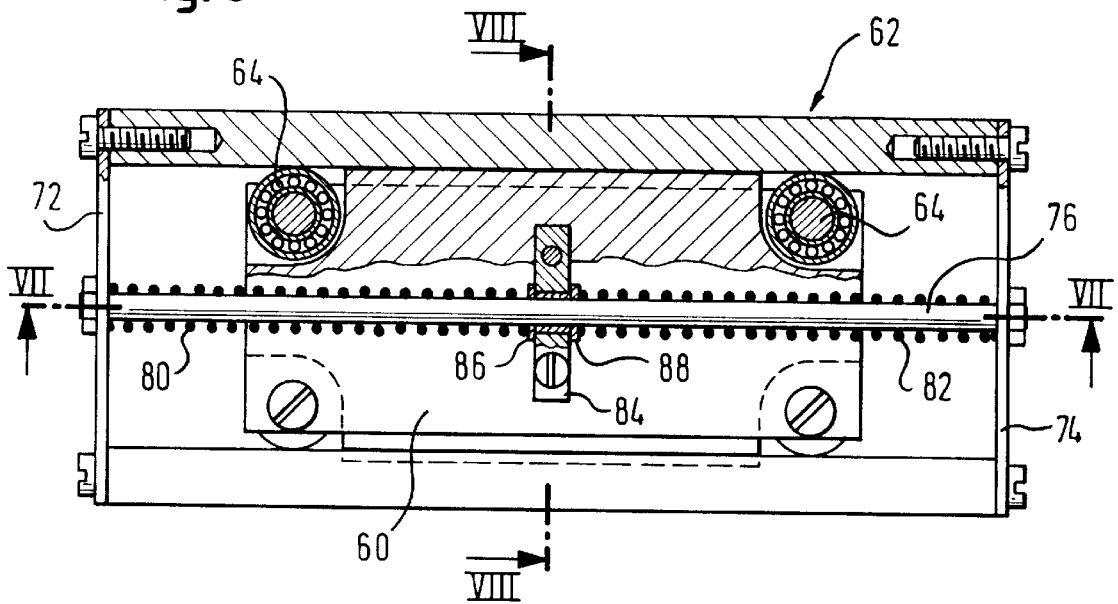
FIG. 6 shows partly in section the mounting of a handle lever head of an industrial truck according to the invention.
Figure 7:
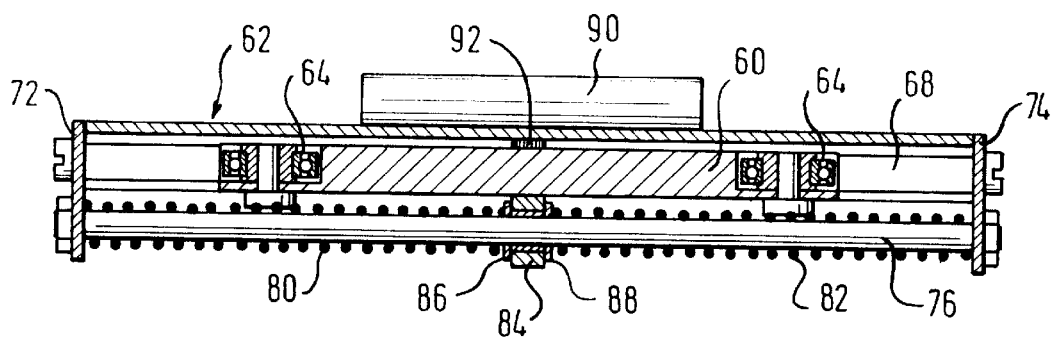
FIG. 7 shows a section through the representation according to FIG. 6 along the line 7—7.
Figure 8:
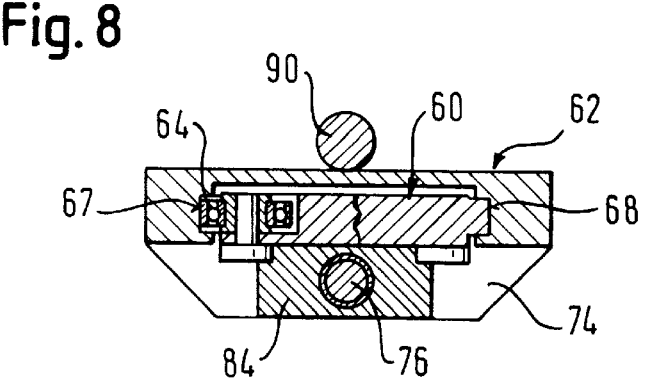
FIG. 8 shows a section through the representation according to FIG. 6 along the line 8—8.
Figure 9:
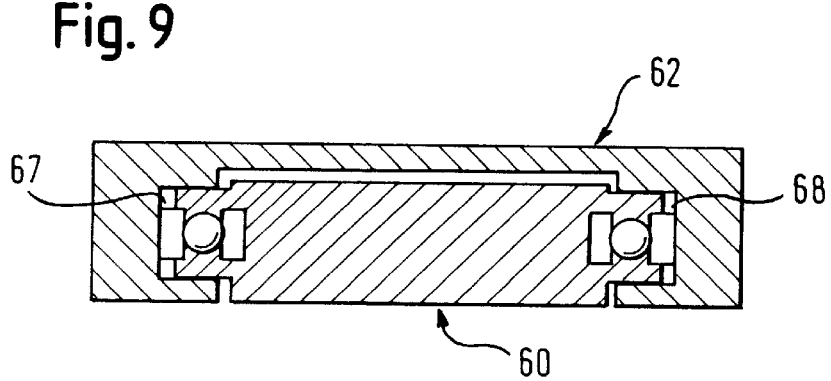
FIG. 9 shows enlarged the detail of FIG. 8.

The sliding guide 62 is an essentially U-shaped component (see FIG. 8 but also 9, wherein in FIG. 9 only one half of the respective roller bearing is indicated). The sliding guide 62 on the inner side lying opposite the arms has guiding grooves 67, 68 into which engage correspondingly formed longitudinal sections of the sliding piece 60. With respect to the wall of the grooves 67,68 consequently a sliding guide takes place. The base surfaces of the grooves 67,68 cooperate with the roller bearings 66. As is further deduced from FIGS. 6 to 8 at the end of the component (sliding guide 62) plates 72, 74 are screwed on which overhang below and hold a continuous rod 76 on which two springs 80, 82 are arranged. On the underside of the sliding piece 60 there is mounted an annular component through which the rod 76 extends. The springs 76, 82 are supported on disks 86, 88 which in the neutral position shown in FIGS. 6 and 7 are supported on abutments on the rod 76. If with a movement of the sliding piece the annular component 84 are co-moved, the corresponding spring 80 or 82 are set under increasing tension whilst the other spring remains in the untensioned position. Both springs 80, 82 are pretensioned to a certain degree.

Figure 10:
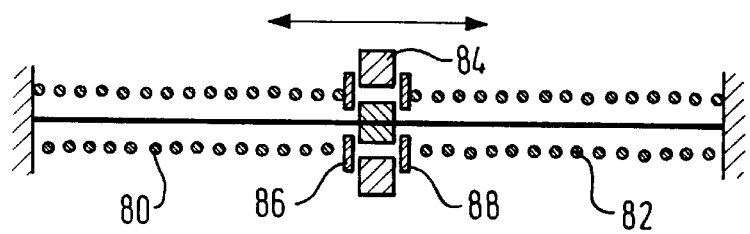
FIG. 10 schematically shows the spring arrangement for the mounting according to FIGS. 6 to 8.

The principle according to the FIGS. 6 to 8 are once again shown simplified in FIG. 10.

Figure 11:
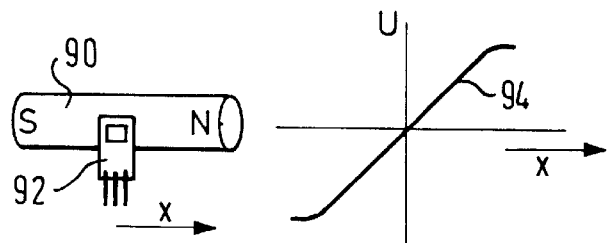
FIG. 11 schematically shows a path sensor for the mounting according to FIGS. 6 to 8 as well as the associated diagram.

The component 62 is connected to the head of a handle lever, for example the head 56 according to FIG. 5 or 26 according to FIG. 1, whilst the sliding piece 60 is connected to the handle lever 58 according to FIG. 5 or 24 according to FIG. 1. If then a pull or push is exerted on to the handle lever head the component 62 moves linearly to the sliding piece 60. On the component 62 along its axis a rod magnet 90 is mounted. On the sliding piece 60 there is mounted a Hall sensor 92. According to the relative position between the magnet 90 and the Hall sensor 92 also the output signal of the Hall sensor changes. This is shown in more detail in FIG. 11. With a central position of the Hall sensor 92 on the magnet 90 the output signal is zero. With a displacement to one pole of the magnet there results an approximately linearly increasing voltage, as is indicated by the curve 94. From a certain measure of the deflection x there enters a saturation.

Figure 12:
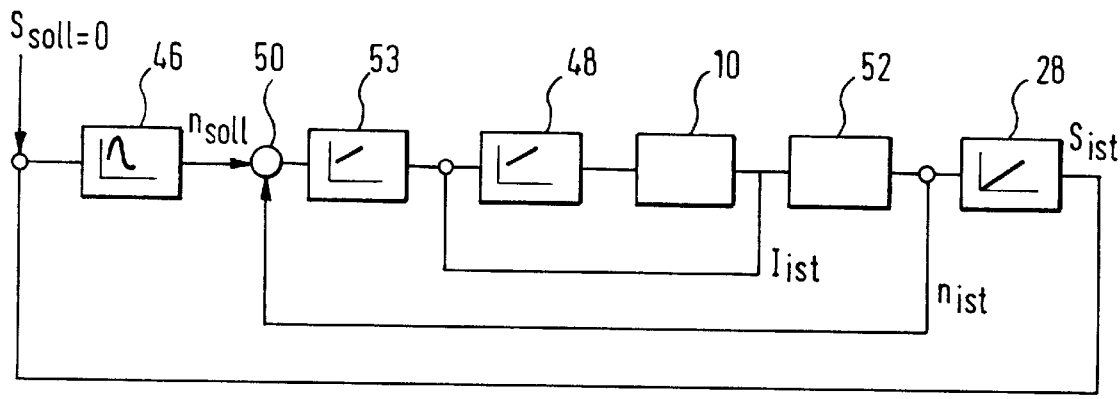
FIG. 12 shows a further block diagram of a control for the industrial truck according to the invention.

The control according to FIG. 4 is dependent on speed and load. If desired also a load-independent control may be provided, as is represented in FIG. 12 as an example. The control components, as far as they correspond to those according to FIG. 4 are provided with the same reference numerals. One recognizes that a third controller 53 is provided which serves as a rotational speed controller. It retains the comparison signal from the rotational speed value $n_{ist}$, of the vehicle 52 which is proportional to the speed and the rotational speed nominal value from the position controller 46. With this control it is achieved that changes in the load do not lead to differing speeds with the same deflection of the handle lever head.

Figure 13:
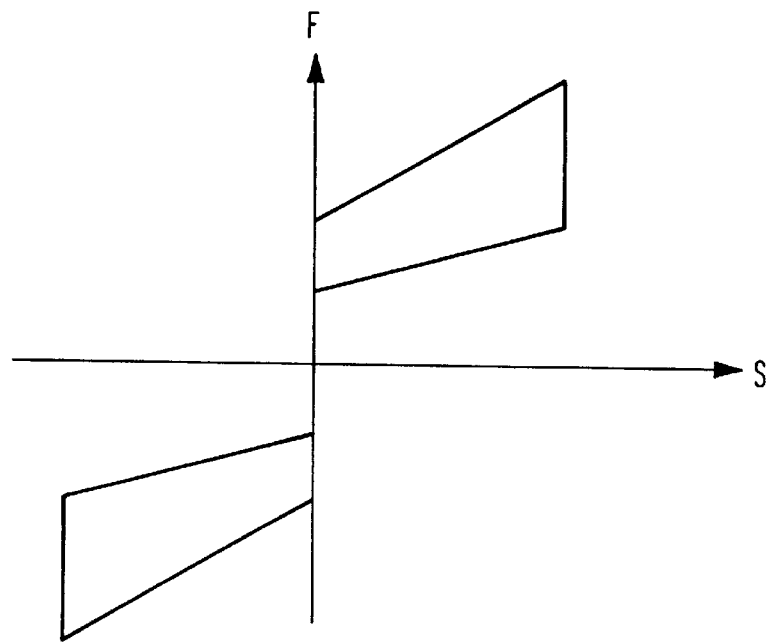
FIG. 13 shows a diagram for the path signal of the path sensor in dependency on the force exerted on the handle lever head.

In FIG. 13 the path signal is represented which is as an actual signal given to the actual-nominal-actual value comparison for the position controller 46. One recognizes that firstly a certain force must be needed in order at all to obtain a deflection. If a deflection is effected with a change in force an immediate follow-up of the path signal is not the result but there arises a hysteresis effect which leads to a damping of the response behaviour of the path sensor. Thus all fluctuating forces on the handle lever, which occur on account of the unevenness of the ground and other effects do not lead to an immediate change of the path signal, at least not when changes lie in the hysteresis region.

The shown device makes possible in a simple manner a stable linear movable mounting of a handle lever head on the handle lever rod with at the same time a simple acquisition of the relative movement between these parts. The steering forces are, as already mentioned, taken up by the roller bearing 66. Forces in the bending direction and torsional forces on the other hand are taken up by the sliding bearing.

What is claimed is:

1. A follower industrial truck comprising:

a drive motor (10);

a handle lever (22, 22a, 22b) having first and second ends, the first end being connected to a steering base of the industrial truck, the steering base being pivotally mounted about a vertical axis of the steering base;

a handle lever head (26, 26a, 26b) which is movably mounted to the second end of the handle lever in a pull and push manner;

a spring arrangement between the handle lever and the head, which biases the head in opposite directions towards a neutral position;

a path sensor (28, 44) which in dependency on the deflection of the head (26, 26a, 26b) from its neutral position produces a path signal ($S_{ist}$), the magnitude of the path signal ($S_{ist}$) being approximately proportional to the extent of the deflection;

a first controller (46) which compares the path signal ($S_{ist}$) with a nominal value ($S_{soll}$) which produces a first nominal value ($I_{soll}$) for the current of the drive motor, and a current controller (48) adapted to receive a comparison current value which is achieved by the comparison of an actual current value ($I_{ist}$) of the drive motor and of the first nominal value ($I_{soll}$) from the first controller (46) in order to produce a setting current value for the drive motor.

2. An industrial truck according to claim 1, characterized in that a damping means is arranged between the handle lever and the head.

3. An industrial truck according to claim 2, wherein the damping is caused by the mechanical friction on the relative movement of the lever handle and the head.

4. An industrial truck according to claim 1, wherein a path sensor is formed by a rod magnet (90) and a Hall sensor (92).

5. An industrial truck according to claim 1 wherein the handle lever moves transversely to the vertical axis of the steering base and a second path sensor produces a second path signal dependent on the extent of the second relative movement and which is given to a steering aid device (20, 18, 16) for producing a steering moment in accordance with the second path signal.

6. A follower industrial truck comprising:

a drive motor (10);

a handle lever (22, 22a, 22b) having first and second ends, the first end being connected to a steering base of the industrial truck, the steering base being pivotally mounted about a vertical axis of the steering base;

a handle lever head (26, 26a, 26b) which is movably mounted to the second end of the handle lever in a pull and push manner;

a spring arrangement between the handle lever and the head, which biases the head in opposite directions towards a neutral position;

a path sensor (28, 44) which in dependency on the deflection of the head (26, 26a, 26b) from its neutral position produces a path signal ($S_{ist}$), the magnitude of the path signal ($S_{ist}$) being approximately proportional to the extent of the deflection;

a first controller (46) is fed by a comparison signal which is achieved by the comparison of the path signal ($S_{ist}$) and a nominal value ($S_o$) for the path signal and which produces a nominal value ($n_{soll}$) for the rotational speed of the drive motor;

a rotational speed controller (53) which receives a further comparison signal which is achieved by the comparison of the nominal value ($n_{soll}$) for the rotational speed from the first controller (46) and an actual value ($n_{ist}$) for the rotational speed of the motor to produce a nominal value ($I_{soll}$), and a current controller (48) adapted to receive a third comparison signal which is achieved by the comparison of the nominal value ($I_{soll}$) of the rotational speed controller (53) and the actual value ($I_{ist}$) of the drive motor in order to produce a setting value for the current of the drive motor.

7. An industrial truck according to claim 6, wherein the handle lever moves in a plane which extends through the vertical axis of the steering base.

8. An industrial truck according to claim 7, wherein the handle lever is further comprised of a lever arm head (56) mounted linearly movable at the upper end of a lever arm rod (58).

9. An industrial truck according to claim 8, wherein the a linear bearing comprises a sliding piece (60) which is mounted in a sliding guide (62).

10. An industrial truck according to claim 9, wherein the sliding guide (62) is formed such that it takes up forces in the vertical plane going through the axis of the handle lever and torsion moments on the handle lever rod, whilst forces occurring transversely to the axis of the handle lever are taken up by roller bearings (64) which cooperate with linear bearing surfaces of the siding guide (62).

11. An industrial truck according to claim 10, wherein the sliding piece (60) at the corner regions in each case comprises a roller bearing (64) which cooperate with vertical bearing surfaces of the sliding guide (62).

* * * * *